United States Patent
Whittle et al.

(10) Patent No.: US 10,077,818 B2
(45) Date of Patent: Sep. 18, 2018

(54) SCALLOPED AIRCRAFT WHEEL ROTOR DRIVE BAR ATTACHMENT BOSS FOR REDUCED THERMAL CONDUCTION

(71) Applicant: Goodrich Corporation, Charlotte, NC (US)

(72) Inventors: Scott Whittle, Springboro, OH (US); Nathaniel John Herrrmann, Springfield, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 44 days.

(21) Appl. No.: 15/186,263

(22) Filed: Jun. 17, 2016

(65) Prior Publication Data
US 2017/0363162 A1    Dec. 21, 2017

(51) Int. Cl.
| F16D 55/36 | (2006.01) |
| F16D 65/12 | (2006.01) |
| B64C 25/44 | (2006.01) |
| F16D 65/847 | (2006.01) |
| F16D 55/00 | (2006.01) |
| F16D 65/78 | (2006.01) |

(52) U.S. Cl.
CPC ............ F16D 65/128 (2013.01); B64C 25/44 (2013.01); F16D 55/36 (2013.01); F16D 65/847 (2013.01); F16D 2055/0058 (2013.01); F16D 2065/785 (2013.01)

(58) Field of Classification Search
CPC ............ F16D 55/36; F16D 2065/1368; F16D 2065/1364; F16D 2065/1372; F16D 2065/138; F16D 2065/1392; F16D 65/128
USPC ............ 188/71.5, 264 G; 301/6.1, 6.2, 6.91
See application file for complete search history.

(56) References Cited

U.S. PATENT DOCUMENTS

| 5,024,297 A | | 6/1991 | Russell | |
| 5,199,536 A | * | 4/1993 | Clark | F16D 55/36 |
| | | | | 188/264 G |
| 5,435,420 A | | 7/1995 | White | |
| 5,851,056 A | | 12/1998 | Hyde | |
| 5,931,269 A | * | 8/1999 | Detwiler | C23C 28/023 |
| | | | | 188/18 A |
| 6,003,954 A | * | 12/1999 | Everhard | F16D 55/36 |
| | | | | 188/71.5 |
| 8,157,062 B2 | | 4/2012 | Enright et al. | |
| 2003/0102710 A1 | * | 6/2003 | Thorp | F16D 55/36 |
| | | | | 301/6.1 |

(Continued)

FOREIGN PATENT DOCUMENTS

| EP | 0398092 | 11/1990 |
| WO | 2009082397 | 7/2009 |

OTHER PUBLICATIONS

EP Search Report dated Oct. 27, 2017 in EP Application No. 17171603.8.

Primary Examiner — Bradley T King
Assistant Examiner — Stephen M Bowes (57) ABSTRACT

A rotor drive bar for use in a brake system, according to various embodiments, includes a drive bar portion configured to be coupled to at least one rotor of the brake system. The rotor drive bar also includes an attachment boss configured to be coupled to an attachment platform of a wheel. The attachment boss has a boss face that faces the attachment platform and at least partially defines a pocket for reducing thermal transfer from the rotor drive bar to the wheel.

19 Claims, 5 Drawing Sheets

(56) References Cited

U.S. PATENT DOCUMENTS

| | | | |
|---|---|---|---|
| 2005/0264090 A1* | 12/2005 | Kaczynski | C23C 4/06 |
| | | | 301/6.1 |
| 2006/0006729 A1* | 1/2006 | Rutten | B64C 25/42 |
| | | | 301/6.2 |
| 2007/0246995 A1* | 10/2007 | Scelsi | B64C 25/36 |
| | | | 301/6.1 |
| 2010/0025172 A1* | 2/2010 | Campbell | F16D 65/12 |
| | | | 188/264 AA |
| 2011/0127826 A1 | 6/2011 | Krabill et al. | |
| 2015/0308526 A1 | 10/2015 | Swank et al. | |

\* cited by examiner

FIG.7

SCALLOPED AIRCRAFT WHEEL ROTOR DRIVE BAR ATTACHMENT BOSS FOR REDUCED THERMAL CONDUCTION

FIELD

The present disclosure relates to aircraft braking systems and, more particularly, to devices for reducing thermal energy transfer from aircraft braking systems to aircraft wheels.

BACKGROUND

Some aircraft include one or more landing gear having wheels for supporting the aircraft while the aircraft is not airborne. Many aircraft may also include a braking system to aid in reducing forward velocity of the aircraft during taxi and landing. The braking system can generate relatively large amounts of heat due to the relatively large mass of the aircraft and due to the relatively high velocity of the aircraft upon landing. The braking system may be directly or indirectly coupled to one or more of the wheels. The wheels may comprise a material having a lower yield strength at relatively high temperatures than that of components of the braking system.

SUMMARY

A rotor drive bar for use in a brake system, in accordance with various embodiments, includes a drive bar portion configured to be coupled to at least one rotor of the brake system. The rotor drive bar also includes an attachment boss configured to be coupled to an attachment platform of an wheel. The attachment boss has a boss face that faces the attachment platform and at least partially defines a pocket for reducing thermal transfer from the rotor drive bar to the wheel.

In any of the foregoing rotor drive bars, the attachment boss is configured to be in contact with the attachment platform of the wheel in response to the rotor drive bar being coupled to the wheel.

In any of the foregoing rotor drive bars, the attachment boss is configured to be in contact with a thermal spacer that is positioned between the attachment boss and the attachment platform of the wheel in response to the rotor drive bar being coupled to the wheel.

In any of the foregoing rotor drive bars, the thermal spacer defines a second pocket for reducing thermal transfer from the thermal spacer to the wheel.

In any of the foregoing rotor drive bars, the pocket has a shape that resembles a "U."

In any of the foregoing rotor drive bars, the pocket has a depth of at least 0.05 inches.

A brake system, in accordance with various embodiments, includes a rotor drive bar having an attachment boss configured to be coupled to an attachment platform of an wheel. The brake system also includes a thermal spacer configured to be positioned between the attachment boss and the attachment platform. The thermal spacer defines a pocket for reducing thermal transfer from the rotor drive bar to the wheel.

In any of the foregoing brake systems, the thermal spacer is configured to be oriented such that the pocket faces the attachment boss in response to the rotor drive bar being coupled to the wheel.

In any of the foregoing brake systems, the thermal spacer is configured to be oriented such that the pocket faces the attachment platform of the wheel in response to the rotor drive bar being coupled to the wheel.

In any of the foregoing brake systems, the pocket is a first pocket positioned on a first face of the thermal spacer and the thermal spacer includes a second pocket on a second face of the thermal spacer such that the first pocket is configured to face one of the attachment boss or the attachment platform of the wheel and the second pocket is configured to face the other of the attachment boss or the attachment platform of the wheel in response to the rotor drive bar being coupled to the wheel.

In any of the foregoing brake systems, the attachment boss defines a second pocket.

In any of the foregoing brake systems, the pocket has a shape that resembles a "U."

In any of the foregoing brake systems, the pocket has a depth of at least 0.05 inches.

In any of the foregoing brake systems, the thermal spacer is configured to receive a bolt extending from the attachment boss to the attachment platform of the wheel for coupling the rotor drive bar to the wheel.

A brake system, in accordance with various embodiments, includes a rotor drive bar having an attachment boss. The brake system also includes a wheel having an attachment platform configured to be coupled to the attachment boss of the rotor drive bar. The attachment platform defines a pocket for reducing thermal transfer from the rotor drive bar to the wheel.

In any of the foregoing brake systems, the pocket has a shape that resembles a "U."

In any of the foregoing brake systems, the pocket has a depth of at least 0.05 inches.

In any of the foregoing brake systems, the attachment boss is configured to be in contact with the attachment platform of the wheel in response to the rotor drive bar being coupled to the wheel.

Any of the foregoing brake systems may also include a thermal spacer configured to be positioned between the attachment boss and the attachment platform of the wheel in response to the rotor drive bar being coupled to the wheel.

In any of the foregoing brake systems, the thermal spacer defines a second pocket for reducing thermal transfer from the rotor drive bar to the wheel.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
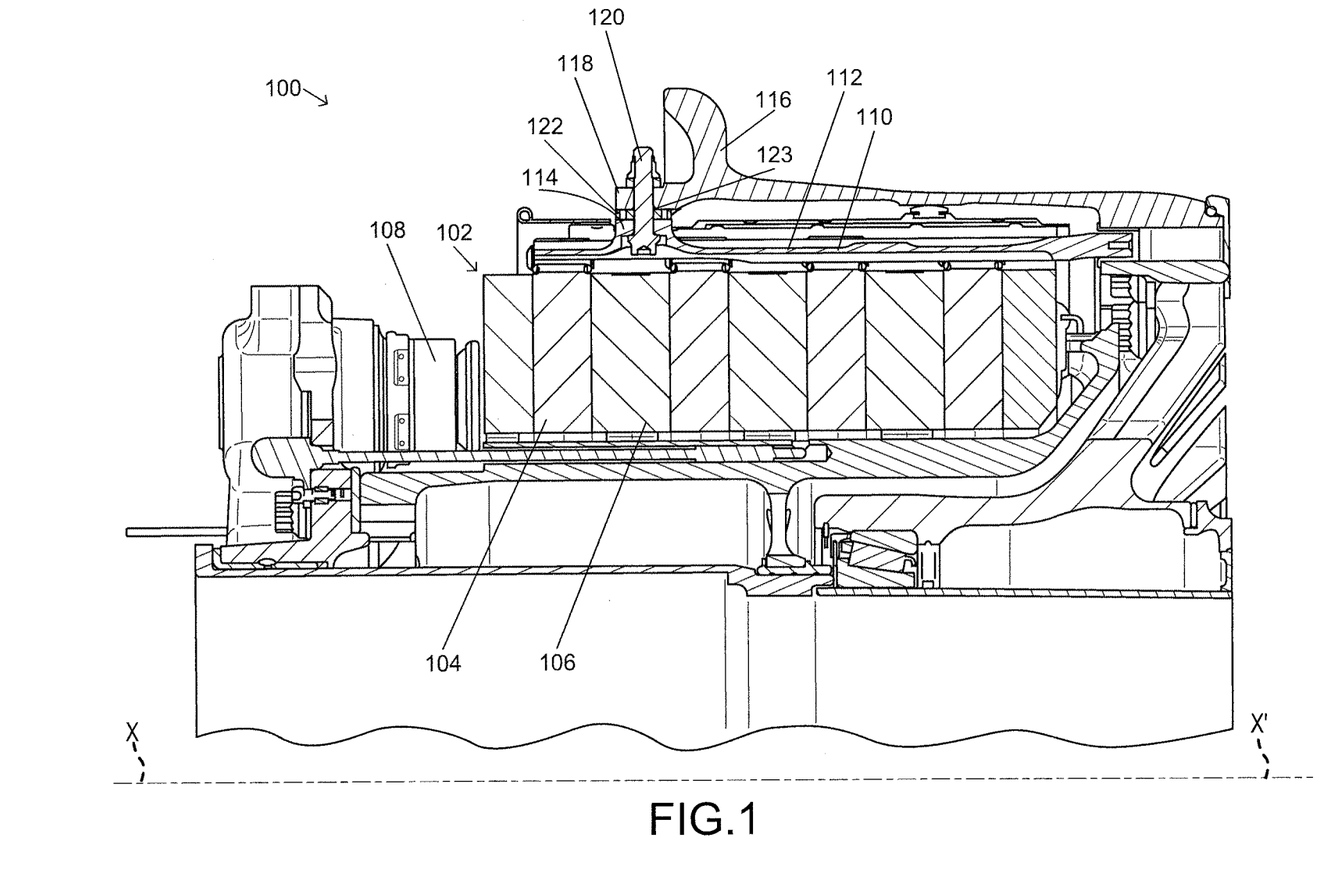
FIG. 1 is a drawing illustrating a cross-sectional view of an aircraft brake system, in accordance with various embodiments.

Referring to FIG. 1, an aircraft brake system 100 in accordance with various embodiments includes a plurality of disks 102. Although this disclosure is directed to an aircraft brake system and an aircraft wheel, one skilled in the art will realize that the features disclosed herein may be used with other brake systems and wheels, such as a car brake system or the like. Plurality of disks 102 includes at least one stator 106 and at least one rotor 104 that rotate about an axis X-X' relative to stators 106. Rotors 104 are coupled to an aircraft wheel 116, or wheel 116, via a rotor drive bar 110. Thus, torque of aircraft wheel 116 is transferred to rotors 104 via rotor drive bar 110, and vice versa.

Aircraft brake system 100, or brake system 100, also includes an actuator 108. Actuator 108 may be actuated to compress plurality of disks 102. When compressed, friction between rotors 104 and stators 106 opposes the torque of rotors 104, thus reducing the angular velocity of aircraft wheel 116. Stated differently, torque is converted to thermal energy due to friction between rotors 104 and stators 106. The thermal energy may propagate from rotors 104 through rotor drive bar 110 and be received by aircraft wheel 116. Aircraft wheel 116 may yield at a lower temperature than rotor drive bar 110. It is desirable to reduce an amount of thermal energy that is received by aircraft wheel 116.

Rotor drive bar 110 includes a drive bar portion 112 and an attachment boss 114. Drive bar portion 112 is designed to be coupled to rotors 104. Attachment boss 114 is designed to be coupled to aircraft wheel 116. In particular, aircraft wheel 116 includes an attachment platform 118 designed to be coupled to attachment boss 114. In the embodiment illustrated in FIG. 1, aircraft brake system 100 includes a thermal spacer 122 designed to be positioned between, and in contact with, attachment boss 114 and attachment platform 118. An attachment bolt 120 is designed to extend through at least a portion of attachment boss 114, thermal spacer 122, and attachment platform 118 and resist relative movement of these components.

In order to reduce thermal energy transfer from rotor drive bar 110 to aircraft wheel 116, a pocket may be defined in at least one of attachment boss 114 or thermal spacer 122 to reduce surface area contact therebetween, and/or a pocket 123 may be defined in at least one of thermal spacer 122 or attachment platform 118 to reduce surface area contact therebetween. This reduction in surface area contact reduces an amount of thermal energy that may transfer between the corresponding components.

Figure 2:
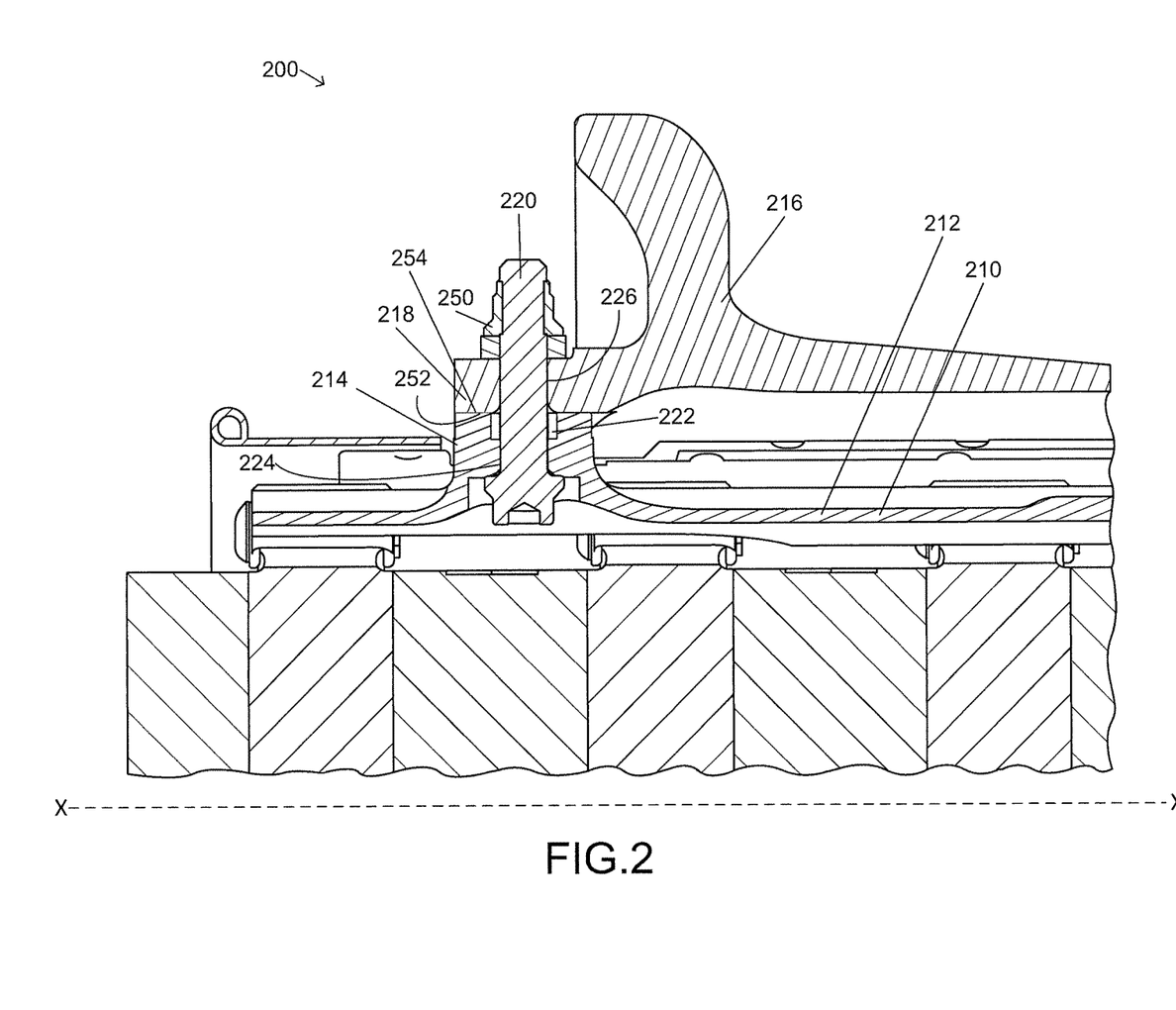
FIG. 2 is a drawing illustrating a cross-sectional view of an aircraft brake system, in accordance with various embodiments.

Turning now to FIG. 2, another aircraft brake system 200 in accordance with various embodiments includes a rotor drive bar 210 and an aircraft wheel 216. Rotor drive bar 210 includes a drive bar portion 212 and an attachment boss 214. Aircraft wheel 216 includes an attachment platform 218. Attachment boss 214 and attachment platform 218 are designed to be coupled together via a bolt 220. Unlike aircraft brake system 100 of FIG. 1, aircraft brake system 200 does not include a thermal spacer. Thus, attachment boss 214 and attachment platform 218 may be in direct contact when coupled together via bolt 220. In particular, a boss face 252 of attachment boss 214 may contact a platform face 254 of attachment platform 218.

In order to couple attachment boss 214 to attachment platform 218, bolt 220 may extend through a boss bolt aperture 224 of attachment boss 214 and may extend through a platform bolt aperture 226 of attachment platform 218 and may then be received by a nut 250 and fastened to nut 250. In various embodiments, any other suitable fasteners or fastening assembly may be used in place of bolt 220 and nut 250.

To reduce thermal energy transfer from rotor drive bar 210 to aircraft wheel 216, attachment boss 214 may include a pocket 222. Pocket 222 may be at least partially defined by boss face 252 and, thus, reduce a surface area of boss face 252. In that regard, in response to rotor drive bar 210 being coupled to aircraft wheel 216, less surface area of attachment boss 214 is in contact with attachment platform 218 and, thus, less thermal energy may transfer from attachment boss 214 to attachment platform 218 via boss face 252 and platform face 254.

Figure 3:
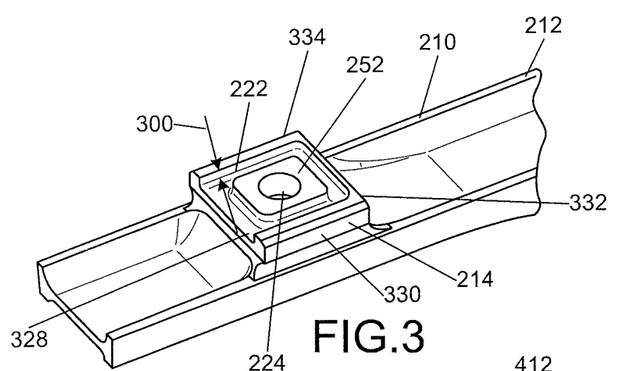
FIG. 3 is a drawing of a rotor drive bar of the aircraft brake system of FIG. 2 having an attachment boss for coupling the rotor drive bar to an aircraft wheel, in accordance with various embodiments.

Turning to FIG. 3, an enlarged view of rotor drive bar 210 in accordance with various embodiments illustrates various features of attachment boss 214 and pocket 222. In particular, attachment boss 214 may extend away from drive bar portion 212 in a direction perpendicular to a length of drive bar portion 212.

As shown in FIG. 3, pocket 222 may have a shape that resembles the shape of a "U." Stated differently, pocket 222 may extend for a distance in a direction parallel and adjacent to a first side 328, a second side 330, a third side 332, and a fourth side 334 of attachment boss 214. Pocket 222 may surround boss bolt aperture 224 but may not contact boss bolt aperture 224. Pocket 222 may be exposed on first side 328 of attachment boss 214 and may not be exposed on second side 330, third side 332, and fourth side 334 of attachment boss 214.

Notably, pocket 222 may not intersect boss bolt aperture 224. Because pocket 222 does not intersect boss bolt aperture 224, water may not reach boss bolt aperture 224 via pocket 222. This reduces the likelihood of water being entrapped within boss bolt aperture 224, which is desirable because standing water in boss bolt aperture 224 may corrode attachment platform 218 of FIG. 2. Thus, in various embodiments, it is desirable for a pocket in an attachment boss, an attachment platform, or a thermal spacer to not intersect with a bolt aperture.

As shown in FIG. 3, pocket 222 is defined by curved surfaces of attachment boss 214. In various embodiments, pocket 222 may be defined by other shapes, such as straight surfaces and angles therebetween that are defined by attachment boss 214. In various embodiments, pocket 222 may have any other shape that reduces a surface area of boss face 252.

Pocket 222 may have a depth 300 away from boss face 252. In various embodiments, depth 300 may be between 0.01 inches and 0.2 inches (0.254 millimeters (mm) and 5.08 mm) or between 0.05 inches and 0.1 inches (1.27 mm and 2.54 mm). In various embodiments and with reference to FIGS. 2 and 3, grease may be used between attachment boss 214 and attachment platform 218. In embodiments in which grease is used between attachment boss 214 and attachment platform 218, it may be desirable for depth 300 to be greater than 0.05 inches (1.27 mm). For example, it may be desirable for depth 300 to be sufficiently great that an air pocket exists between attachment boss 214 and attachment platform 218 due to pocket 222.

In various embodiments, pocket 222 may result in an area of boss face 252 being reduced by, for example, between 5 percent (5%) and 80%, between 10% and 70%, between 20% and 50%, or the like. The amount of surface area reduction may be based on environmental factors. For example, forces may act upon attachment boss 214 from drive bar portion 212 and/or aircraft wheel 216. It is undesirable for these forces to cause attachment boss 214 to yield. Thus, the amount of surface area reduction may be selected such that the greatest amount of thermal transfer reduction is achieved while at the same time the risk of attachment boss 214 yielding is precluded.

In various embodiments, attachment boss 214, and/or drive bar portion 212, may include a metal, such as titanium, titanium-based alloy, cobalt, cobalt-based alloys, nickel, nickel-based alloy, for example, austenitic nickel-chromium-based alloy such as INCONEL™ which is available from Special Metals Corporation of New Hartford, N.Y., USA, a nickel-based alloy having, by weight percent (wt %), nickel 60%, cobalt 15% and chromium 10%, known as IN-100 and available from Vale limited of Toronto, Canada, a stainless steel having, by wt %, chromium 17%, nickel 5% and copper 5%, known as 17-4 ph and available from AK Steel Holding of West Chester, Ohio, one or more stainless steels such as 17-22AS or 15CVD6, or the like.

Figure 4:
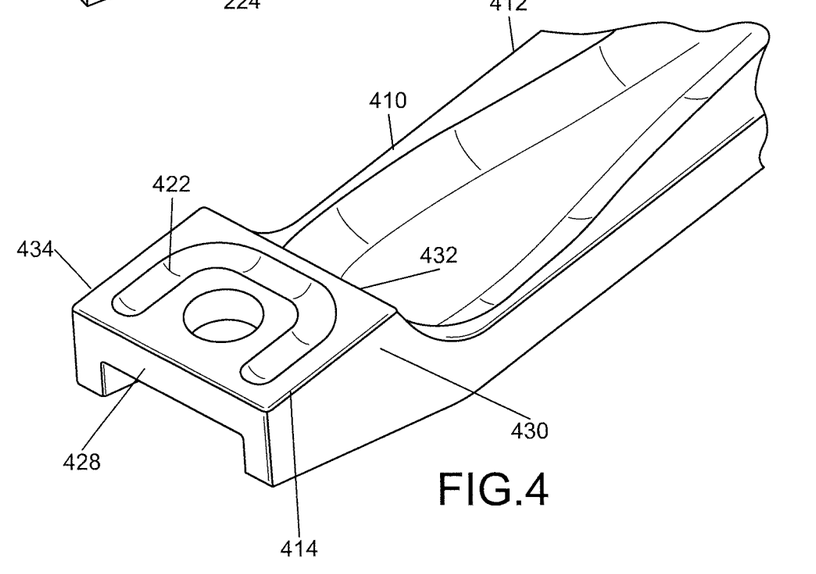
FIG. 4 is a drawing of a rotor drive bar of an aircraft brake system having an attachment boss for coupling the rotor drive bar to an aircraft wheel, in accordance with various embodiments.

Turning now to FIG. 4, another rotor drive bar 410 in accordance with various embodiments includes a drive bar portion 412 and an attachment boss 414. Attachment boss 414 includes a pocket 422. Pocket 422 extends for a distance in a direction parallel and adjacent to a second side 430, a third side 432, and a fourth side 434 of attachment boss 414 and does not extend adjacent to first side 428. Pocket 422 is not exposed on any side of attachment boss 414.

Figure 5:
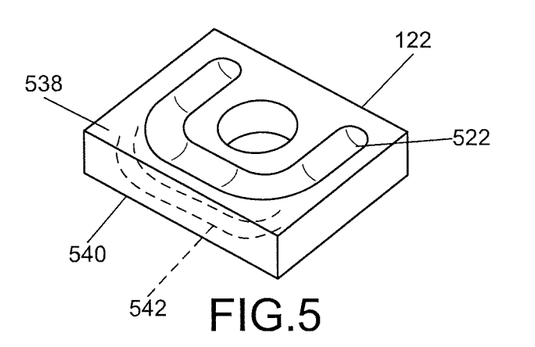
FIG. 5 is a drawing of a thermal spacer designed to be positioned between an aircraft wheel and an attachment boss of a rotor drive bar of the aircraft brake system of FIG. 1, in accordance with various embodiments.

Referring now to FIGS. 1 and 5 and in accordance with various embodiments, thermal spacer 122 may include one or more pockets including a first pocket 522 and a second pocket 542. First pocket 522 may be at least partially defined by a first face 538 and second pocket 542 may be at least partially defined by a second face 540. First pocket 522 and second pocket 542 may have a shape similar to pocket 422 shown in FIG. 4. It may be desirable to include thermal spacer 122 along with one or more pockets if one or more components are thermally challenged.

In various embodiments, thermal spacer 122 may only include first pocket 522. In that regard, thermal spacer 122 may be positioned between attachment boss 114 and attachment platform 118 with first face 538, and thus first pocket 522, facing towards and contacting attachment boss 114 or attachment platform 118. First pocket 522 tends to reduce thermal energy transfer from rotor drive bar 110 to aircraft wheel 116 regardless of whether first face 538 faces and contacts attachment boss 114 or attachment platform 118. Inclusion of both first pocket 522 and second pocket 542 in thermal spacer 122 further reduces thermal energy transfer from rotor drive bar 110 to aircraft wheel 116.

In various embodiments, thermal spacer 122 may include a metal, such as titanium, titanium-based alloy such as Ti-6Al-4V, cobalt, cobalt-based alloys, nickel, nickel-based alloy, for example, austenitic nickel-chromium-based alloy such as INCONEL™ which is available from Special Metals Corporation of New Hartford, N.Y., USA, a nickel-based alloy having, by weight percent (wt %), nickel 60%, cobalt 15% and chromium 10%, known as IN-100 and available from Vale limited of Toronto, Canada, a stainless steel having, by wt %, chromium 17%, nickel 5% and copper 5%, known as 17-4 ph and available from AK Steel Holding of West Chester, Ohio, a sintered stainless steel, or the like.

In various embodiments, a pocket may be included in any one or more of rotor drive bar 110, attachment platform 118, or thermal spacer 122. For example, in various embodiments, an aircraft brake system may include a rotor drive bar with a pocket and an attachment platform without a pocket; in various embodiments, an aircraft brake system may include a rotor drive bar without a pocket, an attachment platform with a pocket, and a thermal spacer with a pocket; and so forth.

Figure 6:
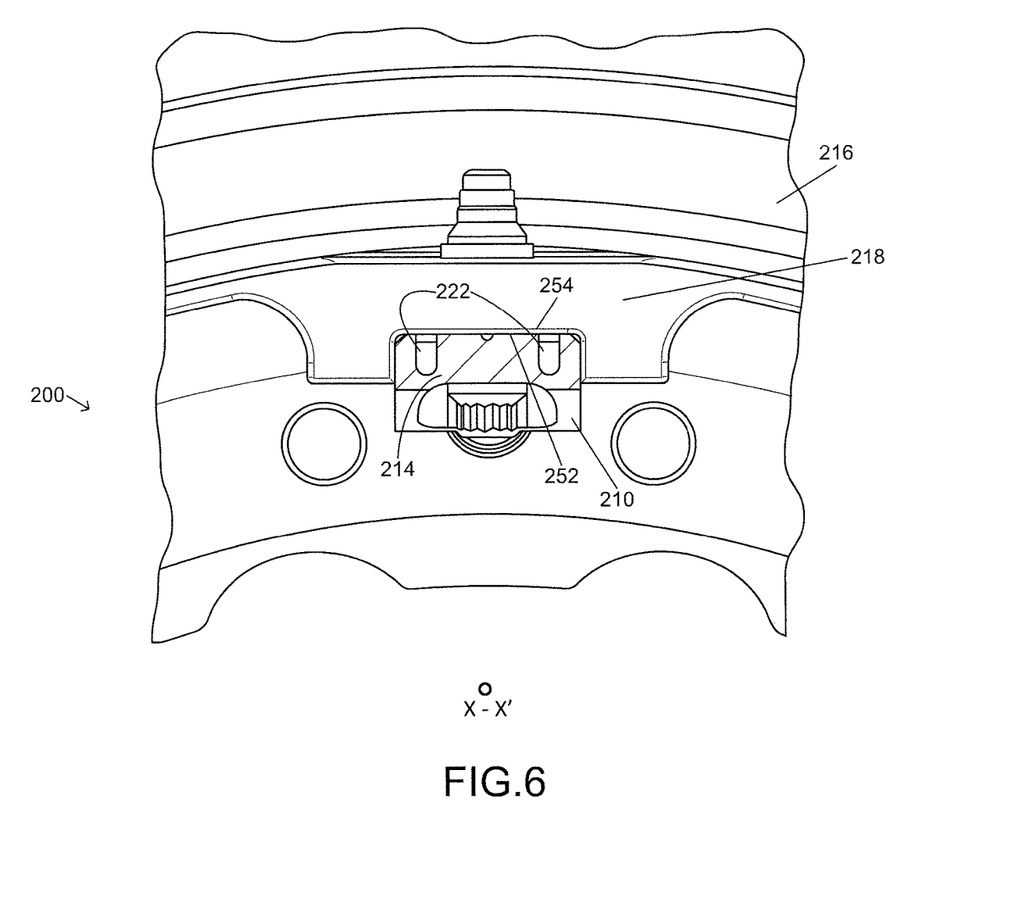
FIG. 6 is a drawing illustrating an end view of the aircraft brake system of FIG. 2 along an axis of the aircraft brake system, in accordance with various embodiments.

Referring now to FIGS. 2 and 6, a view of aircraft brake system 200 in accordance with various embodiments along an axis X-X' illustrates how pocket 222 reduces contact surface between rotor drive bar 210 and aircraft wheel 216. As shown, boss face 252 of attachment boss 214 is in contact with platform face 254 of attachment platform 218. Pocket 222 reduces an area of boss face 252 that may contact attachment platform 218. Thus, less thermal energy may transfer from rotor drive bar 210 to aircraft wheel 216.

Figure 7:
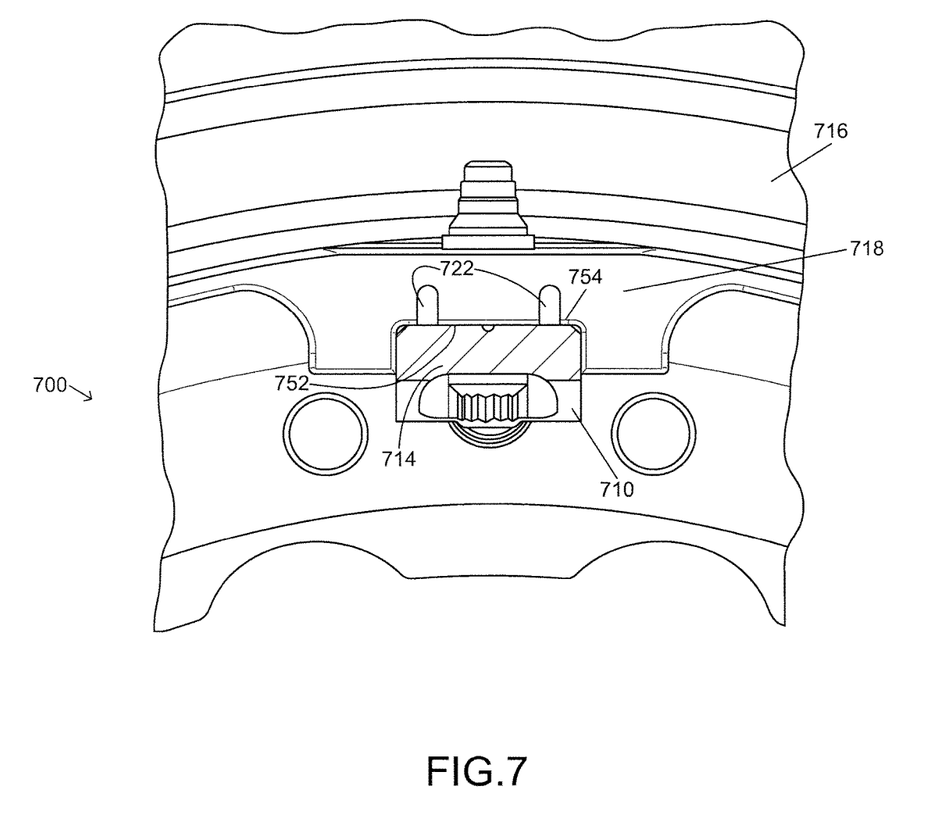
FIG. 7 is a drawing illustrating an end view of an aircraft brake system along an axis of the aircraft brake system, in accordance with various embodiments.

Turning now to FIG. 7, a view of another aircraft brake system 700 in accordance with various embodiments illustrates how a pocket 722 of an attachment platform 718 of an aircraft wheel 716 may reduce thermal energy transfer from a rotor drive bar 710 to aircraft wheel 716. As shown in FIG. 7, attachment platform 718 defines pocket 722. Pocket 722 reduces surface area on a platform face 754 of attachment platform 718. Thus, pocket 722 reduces an area of contact between platform face 754 and a boss face 752 of attachment boss 714, even though attachment boss 714 does not include a pocket. This, in turn, reduces an amount of thermal energy that may transfer from rotor drive bar 710 to aircraft wheel 716.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A rotor drive bar for use in a brake system, comprising:
a drive bar portion configured to be coupled to at least one rotor of the brake system; and
an attachment boss formed monolithic with the drive bar portion and configured to be coupled to an attachment platform of a wheel and having a boss face that faces the attachment platform and includes a pocket formed in the boss face for reducing thermal transfer from the rotor drive bar to the wheel, the attachment boss further defining a bolt aperture that is spaced apart from the pocket.

2. The rotor drive bar of claim 1, wherein the attachment boss is configured to be in contact with the attachment platform of the wheel in response to the rotor drive bar being coupled to the wheel.

3. The rotor drive bar of claim 1, wherein the attachment boss is configured to be in contact with a thermal spacer that is positioned between the attachment boss and the attachment platform of the wheel in response to the rotor drive bar being coupled to the wheel.

4. The rotor drive bar of claim 3, wherein the thermal spacer defines a second pocket for reducing thermal transfer from the thermal spacer to the wheel.

5. The rotor drive bar of claim 1, wherein the pocket has a shape that follows a "U" shaped path along the boss face.

6. The rotor drive bar of claim 1, wherein the pocket has a depth of at least 0.05 inches.

7. A brake system, comprising:
a rotor drive bar having an attachment boss configured to be coupled to an attachment platform of a wheel; and
a thermal spacer configured to be positioned between the attachment boss and the attachment platform and having a surface configured to face at least one of the attachment boss or the attachment platform in response to the rotor drive bar being coupled to the wheel, the surface defining a pocket that follows a "U" shaped path on the surface for reducing thermal transfer from the rotor drive bar to the wheel, the thermal spacer further including a bolt aperture that is at least partially surrounded by the pocket and is spaced apart from the pocket.

8. The brake system of claim 7, wherein the thermal spacer is configured to be oriented such that the pocket faces the attachment boss in response to the rotor drive bar being coupled to the wheel.

9. The brake system of claim 7, wherein the thermal spacer is configured to be oriented such that the pocket faces the attachment platform of the wheel in response to the rotor drive bar being coupled to the wheel.

10. The brake system of claim 7, wherein the pocket is a first pocket positioned on a first face of the thermal spacer and the thermal spacer includes a second pocket on a second face of the thermal spacer such that the first pocket is configured to face one of the attachment boss or the attachment platform of the wheel and the second pocket is configured to face the other of the attachment boss or the attachment platform of the wheel in response to the rotor drive bar being coupled to the wheel.

11. The brake system of claim 7, wherein the attachment boss defines a second pocket.

12. The brake system of claim 7, wherein the pocket has a depth of at least 0.05 inches.

13. The system of claim 7, wherein the bolt aperture of the thermal spacer is configured to receive a bolt extending from the attachment boss to the attachment platform of the wheel for coupling the rotor drive bar to the wheel.

14. A brake system, comprising:
a rotor drive bar having an attachment boss; and
a wheel having an attachment platform formed monolithic with the wheel, configured to be coupled to the attachment boss of the rotor drive bar, and having a platform face that faces the attachment boss and includes a pocket at least partially formed in the platform face for reducing thermal transfer from the rotor drive bar to the wheel, the attachment platform further including a bolt aperture that is at least partially surrounded by the pocket and is spaced apart from the pocket.

15. The brake system of claim 14, wherein the pocket has a shape that follows a "U" shaped path on the platform face.

16. The brake system of claim 14, wherein the pocket has a depth of at least 0.05 inches.

17. The brake system of claim 14, wherein the attachment boss is configured to be in contact with the attachment platform of the wheel in response to the rotor drive bar being coupled to the wheel.

18. The brake system of claim 14, further comprising a thermal spacer configured to be positioned between the attachment boss and the attachment platform of the wheel in response to the rotor drive bar being coupled to the wheel.

19. The brake system of claim 18, wherein the thermal spacer defines a second pocket for reducing thermal transfer from the rotor drive bar to the wheel.

\* \* \* \* \*